Feb. 3, 1970
C. GOSLING
APPARATUS FOR THE CONTINUOUS SEPARATION OF MIXTURES OF SUBSTANCES WHICH MELT WITHOUT DECOMPOSITION
Original Filed July 26, 1966
3,493,114
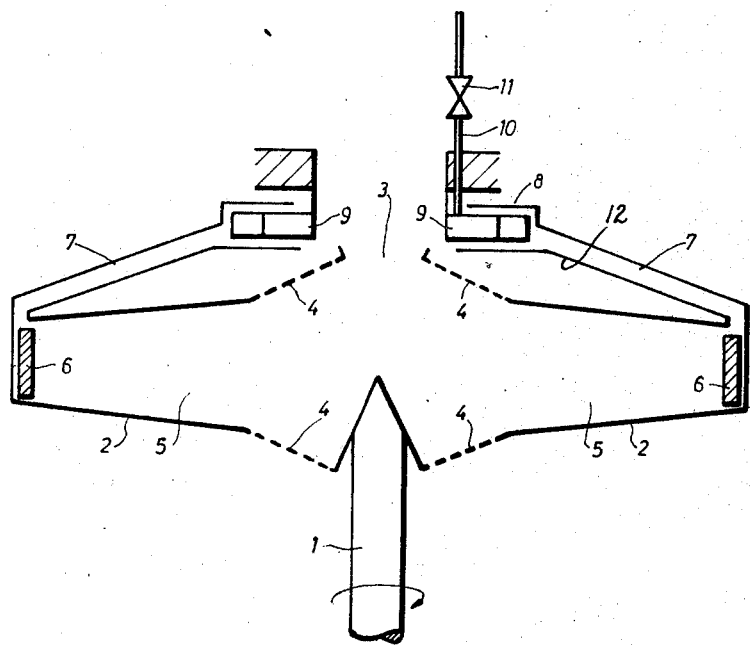
INVENTOR
CLAUS GÖSLING.
BY Burgess, Dinklage & Sprung
ATTORNEYS

United States Patent Office 3,493,114
Patented Feb. 3, 1970

3,493,114
APPARATUS FOR THE CONTINUOUS SEPARATION OF MIXTURES OF SUBSTANCES WHICH MELT WITHOUT DECOMPOSITION
Claus Gosling, Cologne-Stammheim, Germany, assignor to Farbenfabriken Bayer Aktiengesellschaft, Leverkusen, Germany, a corporation of Germany
Continuation of application Ser. No. 568,012, July 26, 1966. This application Dec. 29, 1967, Ser. No. 694,752
Claims priority, application Germany, July 29, 1965, F 46,745
Int. Cl. B01d 35/18, 33/00
U.S. Cl. 210—179                                            1 Claim

ABSTRACT OF THE DISCLOSURE

Apparatus for fractional crystallization in a centrifuge. A peeling disc is used to withdraw melt product and means are provided for throttling flow through the disc, whereby the counterflow of melt through the crystals moving outwardly under centrifugal force, can be controlled by said throttling.

---

This application is a continuation of Ser. No. 568,012, filed July 26, 1966, now abandoned.

The present invention relates to apparatus for the continuous separation by fractional crystallisation of mixtures of substances which melt without decomposition.

Copending, and abandoned, application Ser. No. 539,201, which was filed Mar. 31, 1966 in the name of Jürgen Fleischer, describes and claims an apparatus for the continuous separation by fractional crystallisation of mixtures of substances which melt without decomposition. This apparatus comprises a hollow body which rotates about an axis which is provided with an axial inlet aperture for the mixture of crystals and mother liquor, filter means near the axis, heating means near the periphery, and means which press a portion of the melt against the crystal paste which is caused to flow towards the periphery by centrifugal force, and allow another portion to leave the apparatus.

In order that the apparatus may also be used for mixtures in which the density of the solid phase is lower than that of the liquid phase the present invention provides an apparatus for the continuous separation by fractional crystallisation of mixtures of substances which melt without decomposition, which apparatus comprises a horizontally extending hollow body which rotates about a vertical axis and which is provided with an axial inlet aperture for a mixture of crystals and mother liquor, upper and lower filter means near the axis, heating means near the periphery and an annular chamber arranged coaxially of the hollow body and having a smaller outer diameter than the hollow body, into which chamber open outflow apertures for the melt, and into which projects a fixed peeling or scraper disc which is provided with vanes and which is connected to an outlet pipe controlled by means of a throttle.

In copending application Ser. No. 539,201 the recirculation of the melt is controlled by altering the speed of rotation. This involves the use either of an infinitely variable drive motor or of an infinitely variable transmission system. Both are relatively expensive and delicate pieces of equipment.

It has now been found that the means for pressing a portion of the heated filtrate against the crystal paste can be controlled much more easily during operation if, in accordance with the invention, there is arranged coaxially of, and near to the axis on which the hollow body rotates, an annular chamber into which outlet pipes for the melt open, and into which projects a fixed scraper disc which is provided with vanes and which is in turn connected to an outlet pipe controlled by a throttle.

One embodiment of the invention is shown in vertical section in the accompanying drawing which is given by way of illustration only:

The hollow body 2 provided with an axis 1 is so designed as to be symmetrical when rotated. The pastelike mixture of crystals and mother liquor is fed in through the inlet 3, from where it passes to the upper and lower filter surfaces 4 on which as much as possible of the mother liquor is removed under centrifugal force. A collecting chamber 12 is provided in the upper part of the hollow body 2 for receiving filtrate from the upper filter. At the end of the cleaning section 5, there are heater 6. The heat output determines the melting rate of the crystals and hence the throughflow. The cleaning section 5 is a flow passageway for melt from the heater 6 toward the filters 4, and for the crystals, from the filters 4 toward the heaters 6, and the purification or fractionation occurs in the cleaning section or flow passageway. In order to regulate recirculation the molten pure product is guided through outflow aperture 7 into the annular chamber 8 which is arranged coaxially of the axis and into which a fixed peeling disc 9 provided with vanes projects. The scraper disc 9 can be conventional, for example a "peeling" disc as is disclosed in U.S. Patent 3,013,961 of Dec. 19, 1961. The chamber 8 rotates with the hollow body 2, while the disc 9 is stationary. Liquid flowing through aperture 7 is forced into the disc and then into the pipe 10 by centrifugal force developed by the machine. From this disc 9, the product flows under pressure into the pipe 10 in which a throttle valve 11, operated, either by hand, or by a suitable control mechanism, is incorporated. The liquid level in the annular chamber 8 can be controlled by means of this valve as desired.

Since the difference between the radius of the liquid level in the annular chamber and the maximum radius of the filter, determines the pressure required to press the filtrate against the crystal mass, it is possible in this way to control recirculation during operation by means of the rotor turning at a fixed speed. By virtue of the distance between the inner edge or rim of the inlet opening and the outer edge of the filter being so great that the centrifugal force acting on the crystal paste is greater than the lifting force acting on it in the separating section, the apparatus may also be used for systems in which the density of the solid phase is lower than that of the liquid phase.

In operation of the device, crystal-mother liquor mixture introduced into inlet 1, under the influence of centrifugal force, tends to move radially outwardly. The mother liquor or melt passes through upper and lower filter 4, while the crystals are all thrown outwardly toward heater 6. The heater 6 melts the crystals; part of the melt from the heater 6 passes through outflow aperture 7 and leaves the device via line 10. The balance of the melt from heaters 6 passes radially inwardly through cleaning section or flow passageway 5 toward filters 4, providing counterflow of ice crystals and melt from the heater 6, in the flow passageway 5, during which the desired purification or fractionation occurs.

What is claimed is:
1. An apparatus for the continuous separation by fractional crystallisation, comprising a horizontally extending hollow body which is rotatable about a vertical axis and which is provided with an axial inlet aperture for a mixture of crystals and mother liquor, upper and lower filter means near the axis, and a collecting chamber in the upper part of said hollow body communicating with the upper filter for receiving filtrate therefrom, heating means near the periphery for melting of crystals, the filter means and heating means being radially spaced, means defining a flow passageway between the filter means and heater means for travel of crystals from the filter to the heater and travel of melt from the heater toward the filter for said fractional crystallisation, and means for rotating the hollow body, and an annular chamber arranged coaxially of the hollow body and having a smaller outer diameter than the hollow body, into which chamber open outflow apertures for the melt, and into which projects a fixed peeling disc, said peeling disc being connected to an outlet pipe controlled by means of a throttle.

References Cited

UNITED STATES PATENTS

| | | |
|---|---|---|
| 853,583 | 5/1907 | Guttner et al. _____ 233—2 |
| 2,688,405 | 9/1954 | Sharples _____ 210—179 |
| 2,696,307 | 12/1954 | Rush _____ 210—179 X |
| 2,720,313 | 10/1955 | Pattison _____ 210—179 X |
| 3,073,517 | 1/1963 | Pickels et al. _____ 233—46 X |

JAMES L. DECESARE, Primary Examiner

U.S. Cl. X.R.

210—373, 380